(12) United States Patent
Rasmussen et al.

(10) Patent No.: US 8,505,377 B2
(45) Date of Patent: Aug. 13, 2013

(54) THERMAL PLATE PRECIPITATION MEASUREMENT SYSTEM

(75) Inventors: Roy Rasmussen, Longmont, CO (US); John Hallet, Reno, NV (US)

(73) Assignees: University Corporation for Atmospheric Research, Boulder, CO (US); Board of Regents of the Nevada System of Higher Education, On Behalf of the Desert Research Institute, Reno, NV (US)

( * ) Notice: Subject to any disclaimer, the term of this patent is extended or adjusted under 35 U.S.C. 154(b) by 102 days.

(21) Appl. No.: 13/096,831

(22) Filed: Apr. 28, 2011

(65) Prior Publication Data

US 2012/0272725 A1 Nov. 1, 2012

(51) Int. Cl.
*G01W 1/00* (2006.01)
(52) U.S. Cl.
USPC .................. 73/170.19; 73/170.16; 73/170.17
(58) Field of Classification Search
None
See application file for complete search history.

(56) References Cited

U.S. PATENT DOCUMENTS

| | | | |
|---|---|---|---|
| 2,740,293 A | 4/1956 | Brady | |
| 3,472,088 A | 10/1969 | Ojard | |
| 4,305,280 A | 12/1981 | Vonnegut et al. | |
| 5,744,711 A | 4/1998 | Rasmussen et al. | |
| 6,546,353 B1 | 4/2003 | Hallett et al. | |
| 6,675,100 B1 | 1/2004 | Hallett et al. | |
| 6,708,133 B1 * | 3/2004 | Hallett et al. | 702/130 |
| 6,711,521 B1 * | 3/2004 | Hallett et al. | 702/130 |
| 6,714,869 B1 * | 3/2004 | Hallett et al. | 702/3 |
| 6,751,571 B1 | 6/2004 | Hallett et al. | |
| 7,191,643 B2 | 3/2007 | Rasmussen | |

* cited by examiner

*Primary Examiner* — Andre Allen
(74) *Attorney, Agent, or Firm* — The Ollila Group LLC

(57) ABSTRACT

A thermal plate precipitation measurement system (300) and a method of operating the thermal plate precipitation measurement system (300) is provided. The thermal plate precipitation measurement system (300) includes a first thermal plate system (301A) with first and second thermal plates (302A, 303A) and a second thermal plate system (301B) with first and second thermal plates (302B, 303B). A precipitation rate can be determined by configuring the first and second thermal plates (302A, 303A) of the first thermal plate system (301A) at a first temperature and configuring the first and second thermal plates (302B, 303B) of the second thermal plate system (301B) at a second temperature different than the first temperature. A differential power consumption between the first and second thermal plates (302A, 303A, 302B, 303B) of each of the first and second thermal plate systems (301A, 301B) can be determined and the precipitation rate can be determined based on a difference between the differential power consumption of the first thermal plate system (301A) and the differential power consumption of the second thermal plate system (301B).

15 Claims, 6 Drawing Sheets

THERMAL PLATE PRECIPITATION MEASUREMENT SYSTEM

GOVERNMENT LICENSE RIGHTS

This invention was made with Government support under DTFAWA-03-C-00049 awarded by the Federal Aviation Administration. The Government has certain rights in this invention.

TECHNICAL FIELD

The present invention relates to meteorological instrumentation, and more particularly, to an improved method and apparatus for detection and quantification of precipitation that reaches the earth's surface at a specific location.

BACKGROUND OF THE INVENTION

There are numerous prior art precipitation measurement systems available. As used in the present application, precipitation includes, but is not limited to, rain, mist, drizzle, fog, snow, freezing rain, freezing drizzle, sleet, and hail. Currently, there are various rain gauges and snow gauges known that are designed to quantify precipitation that reaches the earth's surface. Some prior art systems attempt to quantify the precipitation based on a measurable weight of precipitation that accumulates in a container. For example, a container can be provided to collect precipitation and upon accumulation of a predetermined amount, the container pours the precipitation into a weighing container. The weight of the collected sample can be converted into a total accumulation of precipitation.

A problem experienced with these types of systems is that the overall accuracy of the system is dependent upon the mechanical resolutions of accumulation. For example, light precipitation may go unnoticed by evaporating before a measurable amount accumulates.

In an attempt to overcome the various drawbacks of mechanical precipitation measurement systems, thermal plate precipitation measurement systems have been developed and are described in U.S. Pat. Nos. 5,744,711 and 6,546,353, which are hereby incorporated by reference. The thermal plate measurement systems use a pair of thermal plates that are kept at a substantially constant temperature. One of the thermal plates is exposed to precipitation while the other thermal plate is exposed to the same atmospheric temperature and wind, but is protected from precipitation. The difference in power used to maintain the individual thermal plates at the substantially constant temperature is quantified and converted into a precipitation rate.

FIG. 1 shows a prior art thermal plate precipitation measurement system 10. Similar prior art thermal plate precipitation measurement systems are shown and described in the '353 patent. The prior art thermal plate precipitation measurement system 10 includes a sensor electronics stand 11. The sensor electronics stand 11 includes a top thermal plate 12, a bottom thermal plate 13, a sensor controller 14, solar/infrared radiation sensor 16, a temperature sensor 17, and a remote processor 18. The top and bottom thermal plates 12, 13 are connected to a single mounting post 19 angled downward at approximately 30 degrees. The top thermal plate 12 is oriented generally horizontal relative to the earth's surface to permit maximum exposure to falling precipitation. In some cases, however, such as when the thermal plate precipitation measurement system 10 is positioned on an inclined surface, the top thermal plate 12 may be positioned at some angle to horizontal to maximize exposure to falling precipitation.

The bottom thermal plate 13 is positioned in a facial relationship directly under the top thermal plate 12. This orientation subjects the bottom thermal plate 13 to the same ambient temperature and/or airflow while facilitating a maximum protection from falling precipitation. The thermal plate precipitation measurement system 10 may further include an insulation layer 21. The insulation layer 21 may be positioned between the two thermal plates 12, 13 to prevent heat from one of the thermal plates 12, 13, from affecting the other one of the thermal plates 12, 13.

The top thermal plate 12 is further shown with concentric ridges 22, 23, 24. The concentric ridges 22, 23, 24 improve upon the thermal plate provided in the '711 patent and are provided to help catch and retain precipitation on top of the thermal plate 12. Therefore, the precipitation is prevented from flowing off the thermal plate 12 prior to evaporating. It should be appreciated that the bottom thermal plate 13 is substantially identical to the top thermal plate 12 so that the two thermal plates 12, 13 heat and cool in a linear relationship to each other.

The sensor electronics stand 11 is mounted on a post 25 that elevates the top and bottom thermal plates 12, 13 above the ground. The post 25 includes a base plate 26. The base plate 26 can support the mounting posts 19, 20 and orient the thermal plates 12, 13 in a desired direction.

The sensor controller 14 includes a processor that controls the temperature of the thermal plates 12, 13. The sensor controller 14 is in communication with the top and bottom thermal plates 12, 13, the solar/infrared radiation sensor 16, and the temperature sensor 17. The sensor controller 14 is shown in communication with the remote processor 18 via lead 30. The remote processor 18 can collect data from the sensor controller 14 for real-time or subsequent precipitation rate calculation and processing.

As taught by the '353 patent, the top and bottom thermal plates 12, 13 can be maintained at a substantially constant temperature by adjusting the power to the plates 12, 13. As precipitation falls on the top thermal plate 12, the energy required to maintain the temperature of the top thermal plate 12 increases as the precipitation melts and evaporates, thereby cooling the top thermal plate. Ideally, the thermal plates 12, 13 are maintained at a temperature that is below the local boiling point of water, yet hot enough to evaporate the water within a predetermined amount of time. The '353 patent teaches that the predetermined amount of time is ideally 5-10 seconds. As can be appreciated, the additional energy required to maintain the top thermal plate 12 at the predetermined temperature could be determined by the sensor controller 14. The additional energy is due to the latent heat of vaporization and therefore is proportional to the amount of precipitation falling on the top thermal plate 12. If the precipitation is snow or ice, for example, the energy increases by the latent heat of melting, also known as the latent heat of fusion. Consequently, the difference in power consumption of the top plate 12 versus the power consumption of the bottom plate 13 is proportional to the rate of precipitation falling on the top plate 12 and can easily be calculated by those having ordinary skill in the art as explained by the '711 and '353 patents.

FIG. 2 shows another prior art thermal plate precipitation measurement system 20, which is also disclosed in the '353 patent. The thermal plate precipitation measurement system 20 further includes a second thermal plate system 30. The second thermal plate system 30 is identical to the first thermal plate system 10; however, the second thermal plate system 30 is attached to the post 25 by an arm 35 to position the second thermal plate system 30 at a different elevation than the first thermal plate system 10. The '353 patent explains that it is essential to position the thermal plate systems at different elevations because the second thermal plate system 30 is provided to determine if the precipitation is new precipitation or precipitation that has already fallen to the ground and impacts the measurement system due to blowing winds. For example, if the two thermal plate systems 10 and 30 calculate the same amount of precipitation, the precipitation is new. Conversely, if the lower thermal plate system 30 calculates a greater amount of precipitation, then some of the precipitation calculated by the lower thermal plate system 30 is attributable to blowing snow that has already fallen. While the measurement system 20 makes some improvement over the measurement system 10, the measurement system 20 still suffers from noise problems. Further, the measurement system 20 is unable to adequately determine if the precipitation is rain or snow.

While the thermal plate systems described above improve upon the mechanical measurement systems, they still suffer from noise generated from short and long wave radiation, sustained updrafts/downdrafts over the plate, non-horizontal orientation of the thermal plates, etc. Consequently, the current thermal plate systems have a minimal detectable precipitation rate of 0.01 inches/hr (0.25 mm/hr) when the winds are less than 6.6 ft/s (2 m/s). However, with winds greater than 26 ft/s (8 m/s), the detectable precipitation rate increases to 0.04 inches/hr (1 mm/hr). Further, the thermal plate systems currently available have difficulty properly determining what type of precipitation is present. Therefore, there is a need in the art for an improved thermal plate precipitation measuring system.

The present invention overcomes these and other problems and an advance in the art is achieved. The present invention provides a thermal plate precipitation measuring system including two or more individual plate systems that are configured at two different temperatures. For example, one of the plate systems may be configured at a temperature sufficient to vaporize precipitation within a predetermined time while the second plate system may be configured at a lower temperature that can melt precipitation but does not vaporize the precipitation within the predetermined time.

SUMMARY OF THE INVENTION

A thermal plate precipitation measurement system is provided according to an embodiment of the invention. The thermal plate precipitation measurement system comprises a first thermal plate system including first and second thermal plates configured at a first temperature. According to an embodiment of the invention, the thermal plate precipitation measurement system further includes a second thermal plate system including first and second thermal plates configured at a second temperature different than the first temperature.

A method of operating a thermal plate precipitation measurement system is provided according to an embodiment of the invention. The thermal plate precipitation measurement system includes a first thermal plate system with first and second thermal plates and a second thermal plate system with first and second thermal plates. According to an embodiment of the invention, the method comprises a step of configuring the first and second thermal plates of the first thermal plate system at a first temperature. According to an embodiment of the invention, the method further comprises a step of configuring the first and second thermal plates of the second thermal plate system at a second temperature different than the first temperature. According to an embodiment of the invention, the method further comprises a step of determining a precipitation rate based on signals received from the first and second thermal plate systems.

A method of operating a thermal plate precipitation measurement system is provided according to another embodiment of the invention. The thermal plate precipitation measurement system includes a first thermal plate and a second thermal plate. According to an embodiment of the invention, the method comprises steps of heating the first and second thermal plates to a first temperature for a predetermined amount of time heating the first and second thermal plates to a second temperature different than the first temperature. According to an embodiment of the invention, the method further comprises determining a precipitation rate based on a comparison of signals received when the first and second thermal plates are at the first temperature and when the first and second thermal plates are at the second temperature.

DETAILED DESCRIPTION OF THE INVENTION

FIGS. 3-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
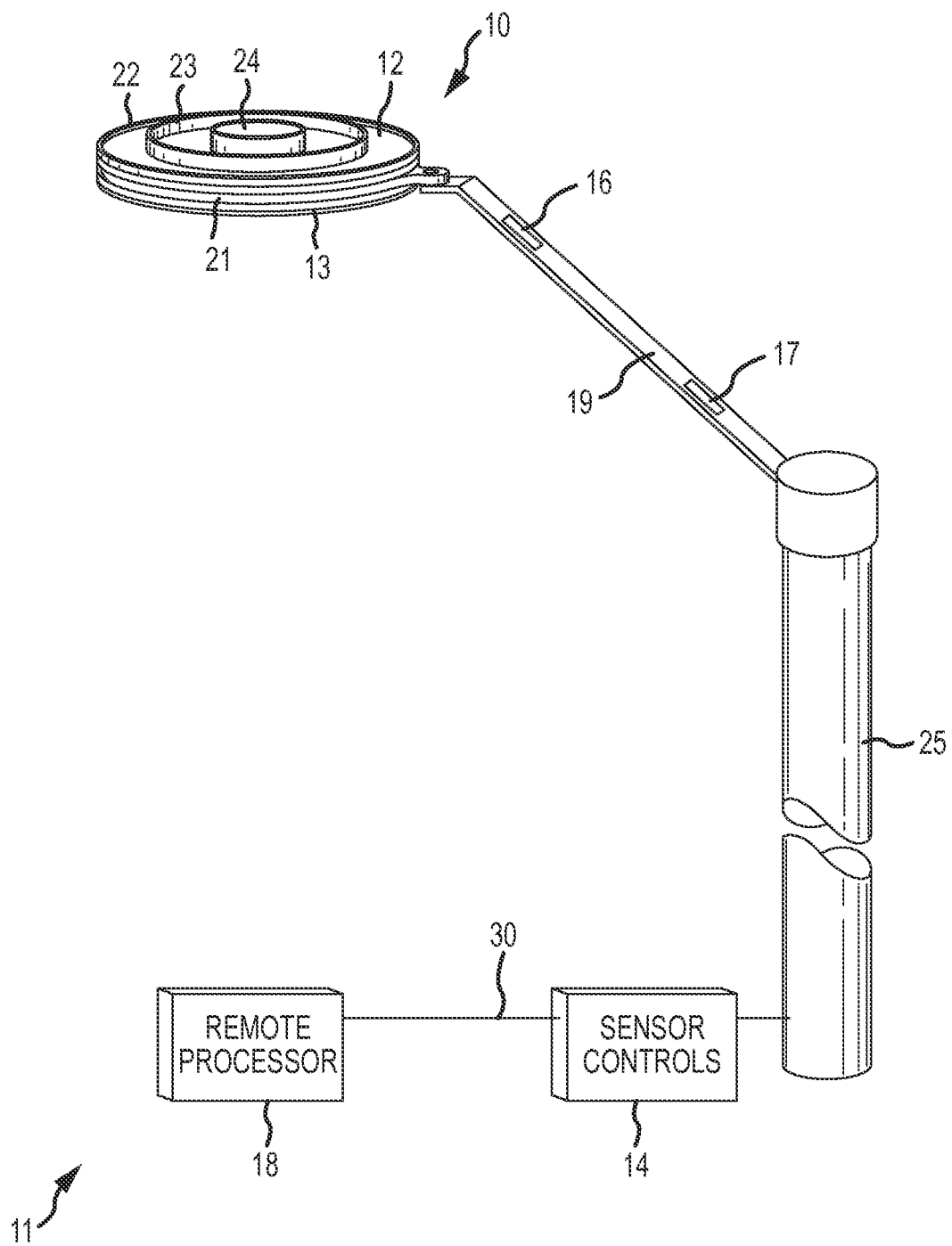
FIG. 1 shows a prior art thermal plate precipitation measurement system.
Figure 2:
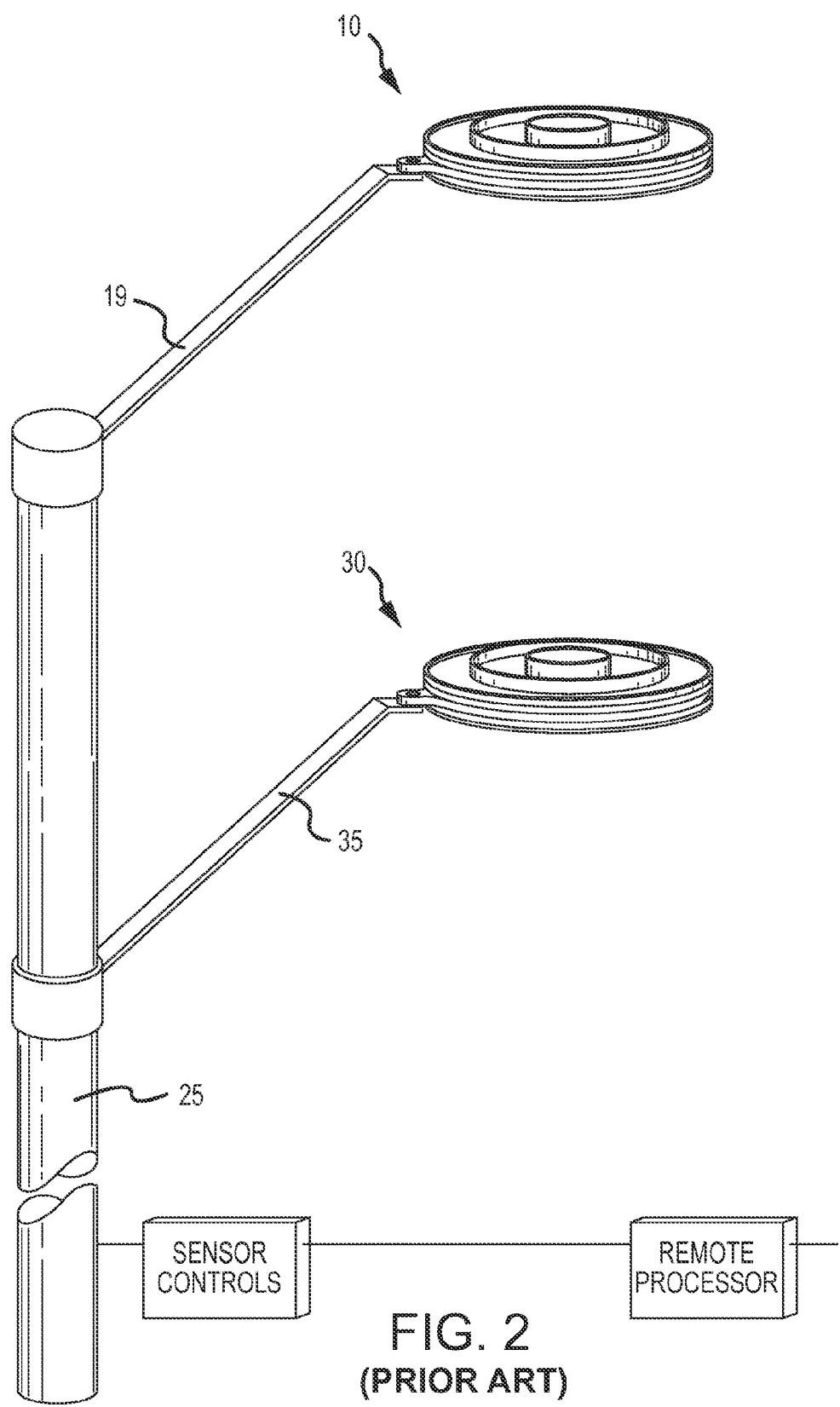
FIG. 2 shows another prior art thermal plate precipitation measurement system.
Figure 3:
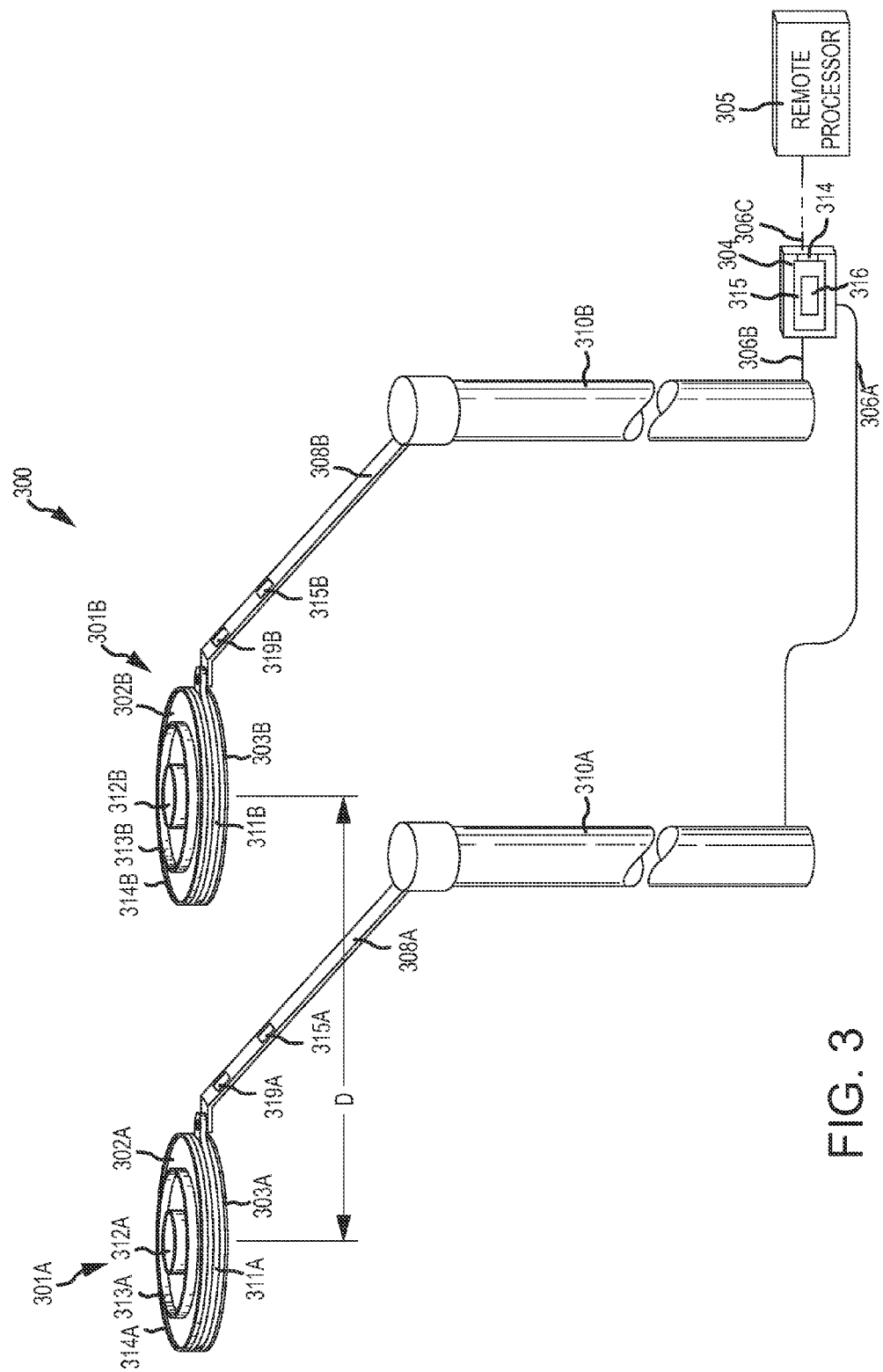
FIG. 3 shows a thermal plate precipitation measurement system according to an embodiment of the invention.

FIG. 3 shows a thermal plate precipitation measurement system 300 according to an embodiment of the invention. According to an embodiment of the invention, the thermal plate precipitation measurement system 300 comprises a first thermal plate system 301A and at least a second thermal plate system 301B. The thermal plate systems 301A, 301B are similar to the prior art thermal plate system shown in the '353 patent and described above. Furthermore, according to an embodiment of the invention, the first and second thermal plate systems 301A, 301B are substantially identical to one another. Similar components share similar reference signs with the exception of an "A" following a component of the first thermal plate system 301A and a "B" following a component of the second thermal plate system 301B. It should be appreciated that while only two thermal plate systems 301A, 301B are shown, the thermal plate precipitation measurement system 300 could include more than two thermal plate systems.

According to an embodiment of the invention, the thermal plate systems 301A, 301B each comprise a top thermal plate 302 and a bottom thermal plate 303. According to an embodiment of the invention, the top and bottom thermal plates 302, 303 are oriented in a substantially parallel relationship with respect to one another. According to an embodiment of the invention, the top and bottom thermal plates 302, 303 of a thermal plate system are configured to be at a substantially constant temperature. The temperature of the top and bottom thermal plates 302, 303 can be controlled and monitored by a sensor controller 304, for example. Alternatively, the temperature of the thermal plates 302, 303 can be configured to be at a substantially constant temperature manually by a user or operator; however, such an approach may be subject to user error. As can be appreciated, the top and bottom thermal plates 302, 303 may include a temperature sensor (not shown), such as an RTD. Alternatively, the temperature of the top and bottom thermal plates 302, 303 may be determined based on the electrical resistance of the thermal plates themselves.

According to an embodiment of the invention, the top and bottom thermal plates 302, 303 are coupled to a mounting post 308 which is further mounted to a post 310. According to an embodiment of the invention, the mounting post 308 is angled downward at approximately 30 degrees. However, it should be appreciated that 30 degrees is merely one example and other angles may be used. According to an embodiment of the invention, the posts 308, 310 can be oriented such that the top thermal plate 302 is oriented to permit maximum exposure to falling precipitation. Similarly to the prior art systems, the bottom thermal plate 303 can be positioned in a facial relationship directly under the top thermal plate 302. Therefore, the bottom thermal plates 303 can be oriented substantially parallel to the top thermal plates 302. This orientation subjects the bottom thermal plate 303 to substantially the same ambient temperature and/or airflow while facilitating a maximum protection from falling precipitation.

As with the prior art plate systems, the posts 308, 310 can elevate the top and bottom thermal plates 302, 303 above the ground. This can prevent the thermal plates 302, 303 from becoming buried under snow, for example. According to an embodiment of the invention, the posts 308A, 308B and 310A, 310B are substantially the same lengths such that the top 302A, 302B and bottom plates 303A, 303B are at substantially the same height above the ground. This is in contrast to the prior art dual thermal plate systems that required the individual plate systems to be mounted at different heights above the ground. The posts 310A, 310B may be mounted on a common base (not shown) that simply rests on the ground or alternatively, the posts 310A, 310B may be mounted directly in the ground. Alternatively, the first and second posts 310A, 310B may be omitted and the thermal plate system 301A, 301B can rest directly on the ground, for example. According to another alternative embodiment, a single post 310 can be provided and separate posts 308A, 308B can be coupled to the common post 310 as a Y (See FIG. 6). According to an embodiment of the invention, the thermal plate systems 301A, 301B can be separated by a predetermined horizontal distance, D. While not shown to scale in FIG. 3, according to one embodiment of the invention, the predetermined horizontal distance, D is approximately 3 feet (0.91 m). However, it should be appreciated that other distances may be used. Preferably, the distance, D is chosen such that the two thermal plate systems 301A, 301B experience substantially the same precipitation, wind, radiation, and temperature while minimizing the thermal interference caused by the temperature of the thermal plates 302, 303. Importantly, the two thermal plate systems 301A, 301B are also mounted at the same angle with respect to the ground in order to expose the two thermal plate systems 301A, 301B to substantially identical conditions. According to an embodiment, the plate systems 301A, 301B are also oriented to within approximately 5 degrees of horizontal.

According to an embodiment of the invention, the top and bottom thermal plates 302, 303 comprise concentric ridges 312, 313, 314. As explained in the '353 patent, the concentric ridges can be provided to help catch and retain precipitation on the top thermal plate 302. It should be appreciated that the concentric ridges 312, 313, 314 are not required for the present invention and should in no way limit the scope of the present invention; however they may increase the accuracy of the thermal plate precipitation measurement system 300. Furthermore, while the thermal plates 302, 303 are shown as comprising substantially circular shapes, the thermal plates 302, 303 may comprise any desired shape and the particular embodiment shown should in no way limit the scope of the present invention. According to an embodiment of the invention, the thermal plate systems 301A, 301B may further include an insulating plate 311 positioned between the top and bottom thermal plates 302, 303 to prevent heat from one of the thermal plates from affecting the other thermal plate. The insulating plate 311 may be formed into substantially the same shape and size as the thermal plates 302, 303, for example. Those skilled in the art will readily recognize suitable insulating materials that can be used for the insulating plate 311 and the particular material chosen should in no way limit the scope of the present invention.

According to an embodiment of the invention, the sensor controller 304 can be configured to control the temperature of the top and bottom thermal plates 302, 303 by adjusting the power (current or voltage) delivered to the thermal plates 302, 303. The first and second thermal plate systems 301A, 301B are shown in communication with the sensor controller 204 via leads 306A, 306B; however, it should be appreciated that the systems 301A, 301B may use a wireless technology instead and the thermal plates 302, 303 can be powered from an external power source. According to an embodiment of the invention, the sensor controller 304 may be in communication with a remote processor 305. The sensor controller 304 is shown in communication with the remote processor 305 via lead 306C; however, it should be appreciated that in other embodiments, the sensor controller 304 can communicate with the remote processor 305 using a wireless technology.

The sensor controller 304 can include an interface 314 and a processing system 315. The processing system 315 may include a storage system 316. The storage system 316 may comprise an internal memory as shown, or alternatively, may comprise an external memory. According to an embodiment of the invention, the interface 314 may perform any necessary or desired signal conditioning, such as any manner of formatting, amplification, buffering, etc. Alternatively, some or all of the signal conditioning may be performed by the processing system 315.

The processing system 315 can conduct operations of the sensor controller 304. The processing system 315 can execute the data processing required to configure the thermal plates 302, 303 to be maintained at a substantially constant temperature. The processing system 315 can execute the data processing required to determine a difference in energy required between the top and bottom thermal plates 302, 303 to maintain the substantially constant temperature. The processing system 315 can also execute the data processing required to conduct the routines 400 and 500 described below. The routines 400 and 500 may be stored in the storage system 316, for example.

The processing system 315 can comprise a general-purpose computer, a micro-processing system, a logic circuit, or some other general purpose or customized processing device. The processing system 315 can be distributed among multiple processing devices. The processing system 315 can include any manner of integral or independent electronic storage medium, such as the storage system 316.

It should be appreciated that the sensor controller 304 may include various other components and functions that are generally known in the art. These additional features are omitted from the description and figures for the purpose of brevity. Therefore, the present invention should not be limited to the specific embodiments shown and discussed.

As explained in the above-mentioned patents, the top and bottom thermal plates are configured at a substantially constant temperature and the difference in power consumption between the top and bottom thermal plates required to maintain the constant temperature is directly proportional to the amount of precipitation falling on the top thermal plate. Therefore, the prior art thermal plate precipitation measurement systems maintain the two thermal plates at a temperature generally below the local boiling point, but hot enough to vaporize the precipitation within a predetermined amount of time. Typically, this temperature is around 85° C. (185° F.). Therefore, in the prior art systems, a difference in power consumption between the top and bottom plates is due to the cooling of the top thermal plate as the precipitation vaporizes and is proportional to the latent heat of vaporization. As is generally known in the art, the latent heat of vaporization for water is approximately 539.4 cal/gram of water. If the precipitation is snow, for example, additional energy must be supplied to the top thermal plate to account for the latent heat of melting as the top thermal plate is further cooled as the snow melts. The latent heat of melting is approximately 79.8 cal/gram of water. With the latent heat of vaporization and/or the latent heat of melting known, the amount of precipitation falling on the top thermal plate 302 can be determined based on the difference in power consumed to maintain the top thermal plate 302 at a constant temperature compared to the bottom thermal plate 303, which is not exposed to the precipitation.

While this calculation may seem relatively straight forward, numerous factors can affect the measurement. Some of the known factors that can affect the measurement are sustained updrafts/downdrafts acting on the thermal plate, solar radiation, etc. Furthermore, if the precipitation comprises snow or other forms of frozen precipitation, the latent heat of melting required to melt the frozen precipitation needs to be accounted for in the calculation. The prior art teaches that a different energy curve can be generated if the precipitation is frozen. However, the prior art cannot adequately determine an accurate amount of frozen precipitation or adequately determine a mixture of snow and rain, for example.

According to an embodiment of the invention, the first thermal plate system 301A is configured as in the prior art with a first temperature sufficient to vaporize precipitation within a predetermined amount of time. The first temperature may be varied based on the ambient temperature determined using a temperature sensor 315A, for example. According to an embodiment of the invention, the top and bottom thermal plates 302A, 303A of the first thermal plate system 301A may be maintained at the first temperature of approximately 85° C. (185° F.). The first thermal plate system 310A can therefore be used to determine the amount of precipitation based on the latent heat of vaporization and, if frozen precipitation is present, the latent heat of melting as well. The general operation of the first thermal plate system 301A is therefore, well known from the '353 and '711 patents discussed above.

According to an embodiment of the invention, the second thermal plate system 301B is configured at a second temperature. According to an embodiment of the invention, the second temperature is less than the first temperature. According to an embodiment of the invention, the second temperature is sufficient to melt precipitation falling on the top thermal plate 302B, but is not hot enough to vaporize precipitation within the predetermined amount of time. Preferably, the second temperature is low enough that less than 5% vaporization occurs within a predetermined time, for example a one-minute period. However, in some embodiments, the second temperature should be chosen such that the precipitation evaporates from the top thermal plate 302B within a second predetermined amount of time, for example 10 minutes to prevent the top thermal plate 302B from flooding. According to one embodiment of the invention, the second temperature is approximately 35° C. (95° F.). However, it should be appreciated that the second temperature should not be limited to the present example. Further, the sensor controller 304 may vary the second temperature based on the ambient temperature measured by the temperature sensor 315B.

With the second temperature being below the required vaporization temperature, a difference in power consumption detected between the top and bottom thermal plates 302B, 303B of the second thermal plate system 301B is due to the latent heat of melting, but not the latent heat of vaporization. Therefore, if the precipitation is rain, the difference in energy between the top and bottom thermal plates 302B, 303B required to maintain the second temperature should be relatively small and below a threshold difference that may be established by a user or by the manufacturer and stored in the sensor controller 304. In contrast, if the precipitation contains snow or some other frozen precipitation, the second thermal plate system 301B should measure a difference in the power consumed by the top and bottom plates 302B, 303B required to maintain the second temperature. The difference in power consumption is due to the latent heat of melting required to melt the frozen precipitation.

According to an embodiment of the invention, an estimated precipitation rate can be calculated for each of the thermal plate systems 301A, 301B according to the methods outlined in the above-mentioned patents that are well known in the art. For example, the current required to maintain the substantially constant temperatures for the thermal plates can be monitored and controlled by the sensor controllers 304A, 304B. Alternatively, the voltage can be controlled to maintain the constant temperatures. As taught by the above-mentioned patents, the difference in power consumption of the top thermal plate 302A, 302B versus the power consumption of the bottom thermal plate 303A, 303B is directly proportional to the rate of precipitation falling on the top thermal plate 302A, 302B. However, if the precipitation is rain, the second thermal plate system 301B will not detect any precipitation as substantially none of the precipitation is vaporized. Further, if the difference in power consumption from only one thermal plate system is monitored, the noise generated by various external influences may generate erroneous precipitation readings. For example, if the thermal plate systems are experiencing a sustained wind drift during a rain event, the second thermal plate system 301B may generate an erroneous measurement based on a difference in energy drawn by the top and bottom thermal plates 302B, 303B indicating frozen precipitation. This erroneous measurement will also be generated by the first thermal plate system 301A because of the substantially similar environmental conditions experienced by the two systems 301A, 301B. Therefore, both thermal plate systems 301A, 301B will produce inaccurate precipitation measurements.

According to an embodiment of the invention, the precipitation rate can be calculated based on a comparison between the power consumption difference of the first thermal plate system 301A and the power consumption difference of second thermal plate system 301B. By subtracting the two power consumption differences, the impact of radiation, organized updrafts/downdrafts, emissivity changes, and other external sources of noise that are present in both of the thermal plate systems 301A, 301B cancel. As can be appreciated the power consumption required to maintain the first thermal plate system 301A at the first temperature is due to both the latent heat of melting and the latent heat of vaporization while the power consumption required to maintain the second thermal plate system 301B at the second temperature is due to the latent heat of melting. Therefore, the subtracted signal is proportional to the latent heat of vaporization. This can easily be converted into a precipitation rate using the well-known relationship of the heat required to vaporize one gram of water.

According to an embodiment of the invention, the thermal plate precipitation measurement system 300 can also determine if the precipitation is rain, frozen precipitation, or a mixture. Frozen precipitation includes, but is not limited to snow, freezing rain, freezing drizzle, sleet, and hail. This determination is made possible due to the second thermal plate system 301B. Because the second thermal plate system 301B is below the temperature required for vaporization, if a differential power consumption between the top and bottom thermal plates 302B, 303B exceeds a threshold, the difference is attributable to melting. The threshold level may be user set or set by a manufacturer, for example. Providing a threshold level minimizes the false readings due to external noise. Therefore, if there is a threshold difference in the power consumption required to maintain the top and bottom plates 302B, 303B at the second temperature, the thermal plate precipitation measurement system 300 can determine that the precipitation contains at least some frozen precipitation. Furthermore, based on the subtracted signal of the two thermal plate systems 301A, 301B, the latent heat of vaporization can be determined, which provides the liquid equivalent of the precipitation.

Therefore, once the liquid equivalent amount of precipitation is determined, an expected differential power consumption can be determined for the latent heat of melting. For example, if the differential power consumption used by the second thermal plate system 301B is equivalent to 79.8 cal/gram of water based on the amount of precipitation determined from the subtracted signal, substantially all of the precipitation is frozen. However, if the differential power consumption of the second thermal plate system 301B is equivalent to 39.9 cal/gram of water, the precipitation would be a 50/50 snow/rain mixture. Therefore, once the amount of precipitation is determined based on the difference between the first and second plate systems 301A, 301B, the composition of the precipitation can be estimated based on the power consumption difference of the second plate system 301B.

Figure 4:
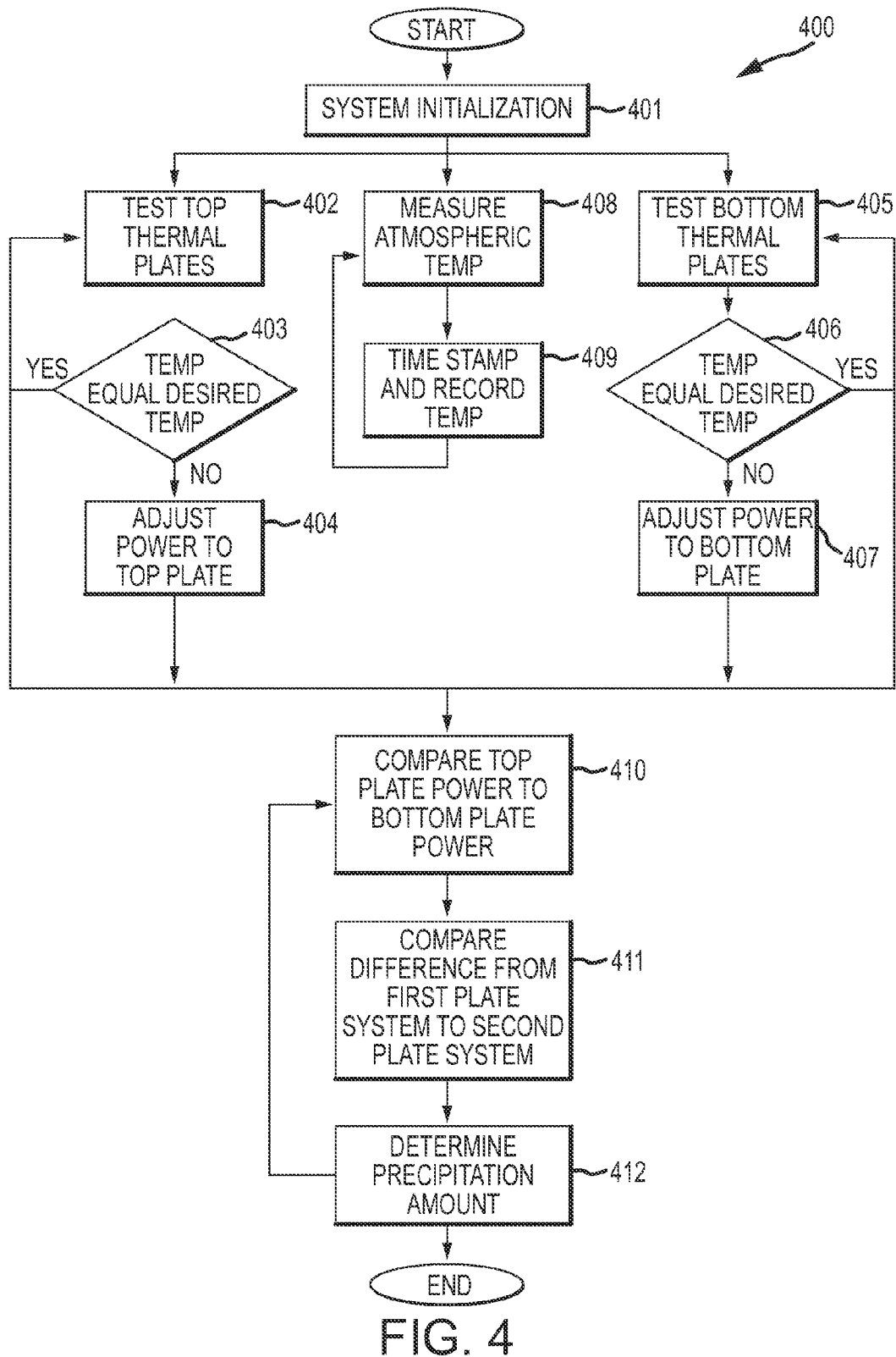
FIG. 4 shows a precipitation determination routine according to an embodiment of the invention.

FIG. 4 shows a precipitation determination routine 400 that may be performed by the sensor controller 304 and/or the remote processor 305 to determine a precipitation rate and amount according to an embodiment of the invention. The precipitation may be determined on a substantially real-time basis or the data may be retrieved by the remote processor and processed later. The routine 400 may be performed by the processing system 315 of the sensor controller 304.

According to an embodiment of the invention, routine 400 starts in step 401 where a system initialization takes place. The system initialization includes, but is not limited to heating the top 302A, 302B and bottom plates 303A, 303B to their respective first and second temperatures. The top and bottom plates of each of the first and second plate systems 301A, 301B may also be calibrated to account for any difference in required power in the absence of precipitation. As discussed above, the top and bottom plates 302A, 303A of the first plate system 301A may be heated to a first temperature that is below the local boiling point of water, yet hot enough to vaporize precipitation within a predetermined amount of time. According to one embodiment, the first temperature is 85° C. (185° F.). Alternatively, the first temperature may be above the local boiling point of water in cases where heavy precipitation is occurring or is likely to occur. According to an embodiment of the invention, the top and bottom plates 302B, 303B of the second plate system 301B are heated to a second temperature, which is less than the first temperature. As discussed above, in one embodiment, the second temperature is 35° C. (95° F.).

When the thermal plates 302, 303 of the first and second plate systems 301A, 301B are at their optimal first and second temperatures, routine 400 enters into a substantially continuous cycle. The temperatures of the top plates 302A, 302B of the first and second plate systems 301A, 301B are tested in step 402. In step 403, a determination is made for each of the top thermal plates 302A, 302B as to whether the top plates 302A, 302B are equal to the desired first and second temperatures. If the temperature of either of the top plates does not equal the desired temperature, the power provided to the thermal plates 302, 303 is adjusted in step 404.

Substantially simultaneously to steps 402-404, the temperature of the bottom plates 303A, 303B of the first and second plate systems 301A, 301B are tested in step 405. In step 406, a determination is made for each of the bottom thermal plates 303A, 303B as to whether the bottom plates 303A, 303B are equal to the desired first and second temperatures, respectively. If the temperature of either of the bottom plates does not equal the desired temperature, the power provided to the bottom plates 303A, 303B is adjusted in step 407.

According to an embodiment of the invention, substantially concurrently with the testing and adjusting of the temperature of the top and bottom plates, the ambient temperature is measured using temperature sensors 315A, 315B, or both in step 408. The ambient temperature can be time-stamped and recorded in step 409, if desired.

According to an embodiment of the invention, while the temperature of the top and bottom plates 302, 303 are being maintained in steps 402-409, signals from the first and second thermal plate systems 301A, 301B are sent to the sensor controller 304. According to an embodiment of the invention, the signals are representative of the power drawn by the top thermal plate 302 required to maintain the constant temperature is compared to the power drawn by the bottom thermal plate 303 for each of the thermal plate systems 301A, 301B in step 410 to generate a differential power consumption for each of the thermal plate systems 301A, 301B. As discussed above, a differential power consumption above a threshold level between the top and bottom plates 302A, 303A of the first plate system 301A is due to the latent heat of melting as well as the latent heat of vaporization. Because of the lower second temperature of the second plate system 301B, a differential power consumption above a threshold level between the top and bottom plates 302B, 303B of the second plate system 301B is attributable to the latent heat of melting.

In step 411, the signals from the first and second thermal plate systems 301A, 301B are compared. According to an embodiment of the invention, the comparison comprises determining the difference in the differential power consumed by the top and bottom plates 302, 303 for the first and second plate systems 301A, 301B. As explained above, a difference in the differential power consumption between the two plate systems 301A, 301B is proportional to the latent heat of vaporization. The difference between the two plate systems 301A, 301B substantially negates external influences that are experienced by both systems, such as sustained wind, solar radiation, loss of emissivity, etc. Therefore, the difference results in less noise experienced by the systems. In addition, because the two plate systems 301A, 301B experience substantially the same conditions, changes to the surfaces of the thermal plates that change the emissivity will substantially cancel. For example, a new thermal plate may emit less radiation than a weathered plate that is dirty, thereby changing the emissivity of the plate. This change is reduced or substantially canceled according to the present embodiment.

In step 412, the amount of precipitation is determined based on the difference between the differential power consumption of the first and second plate systems 301A, 301B. The amount of precipitation may be determined based on a calibration curve previously generated. Alternatively, the amount of precipitation can be determined from a look-up table, equation, etc. that relates power consumption to precipitation. With the precipitation determined, the routine 400 can either end or return to step 410 to make another comparison of the top and bottom thermal plates 302, 303.

While some prior art thermal plate precipitation measurement systems require a precipitation on/off sensor or a solar radiation sensor to end the measurement routine, the present invention can determine the end of a precipitation event when the difference between the signals from the first and second plate systems 301A, 301B are less than a threshold difference. This is because when the difference is less than a threshold difference, the precipitation falling on the top thermal plates 302A, 302B is below a detectable level. However, it should be appreciated that the first and second thermal plate systems 301A, 301B may include a solar radiation sensor 319A, 319B as described in the prior art systems or an on/off precipitation sensor or other independent precipitation sensor.

Figure 5:
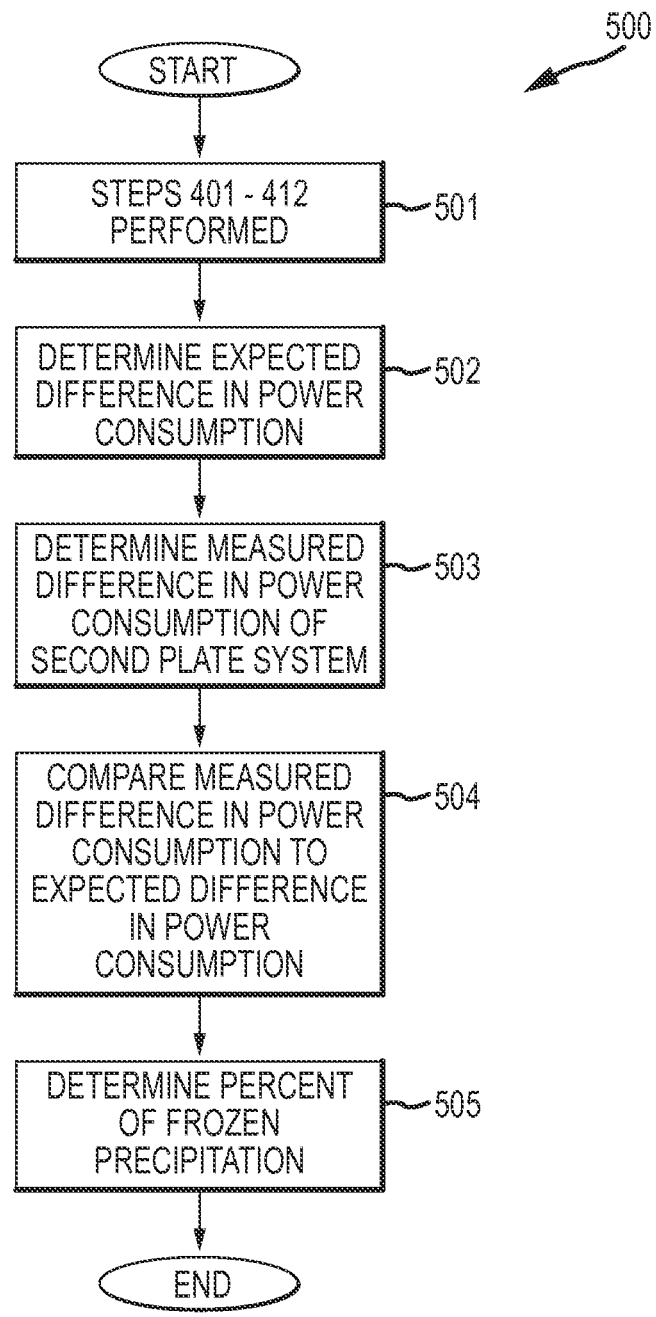
FIG. 5 shows a precipitation composition routine according to an embodiment of the invention.

FIG. 5 shows a precipitation composition routine 500 according to an embodiment of the invention. The precipitation composition routine 500 may be performed by the sensor controller 304. In step 501, the steps 401-412 from routine 400 are performed to determine a precipitation amount and/or rate. With the amount of precipitation determined, an expected differential power consumption between the first and second thermal plates 302B, 303B can be determined in step 502. The expected differential power consumption is based upon the expected latent heat of melting based on a 100% frozen precipitation. In other words, the expected differential power consumption assumes that substantially all of the precipitation determined in routine 400 is first melted and then vaporized.

In step 503, a measured differential power consumption can be determined as explained above.

In step 504, the measured differential power consumption can be compared to the expected differential power consumption.

In step 505, the percent of frozen precipitation can be determined. The determination can be made based on the comparison of the measured differential power consumption and the expected differential power consumption. For example, with an amount of precipitation determined from routine 400, a calculable amount of energy would be required to melt all of the precipitation. This amount of energy would correspond to approximately 79.8 cal/gram of water (latent heat of melting). If the amount of additional energy required by the top thermal plate 302B of the second plate system 301B is less than the expected amount of energy, then the precipitation falling on the plate systems 301A, 301B is less than 100% frozen precipitation. For example, based on the determined amount of precipitation from routine 400, if the energy difference from the second thermal plate system 301B corresponds to approximately 39.9 cal/gram of water, the precipitation falling on the plate systems 301A, 301B comprises approximately 50% rain and 50% frozen precipitation. Therefore, based on the difference in power consumption from the second thermal plate system 301B, an approximation can be made as to the composition of the precipitation falling on the thermal plate precipitation measurement system 300.

With the approximate composition determined, the additional energy due to the latent heat of melting can be added back to the energy difference calculated in step 411 to calculate a snowfall rate. As can be appreciated, the differential value between the first and second plate systems 301A, 301B provides a liquid equivalent of precipitation. If the snowfall rate is desired rather than the liquid equivalent of the snowfall rate, the energy required to melt the snow should be added back into the total energy calculation to provide the snowfall rate rather than the liquid equivalent of the snowfall rate.

The above description has described a system for improving precipitation determinations using first and second thermal plate systems 301A, 301B that are maintained at substantially different temperatures. It should be appreciated that if two separate thermal plate systems 301A, 301B are not readily available the sensor controller 204 can control a single thermal plate system, such as the thermal plate system 301A. According to an embodiment of the invention, the sensor controller 204 can cycle the single thermal plate system 301A between the first and second temperatures. For example, the sensor controller 204 can maintain the thermal plate system 301A at the first temperature for a predetermined amount of time, for example one minute. The sensor controller 204 can then maintain the thermal plate system 301A at the second temperature for a predetermined amount of time, for example one minute. By cycling between the first and second temperatures, the sensor controller 204 can determine the difference in energy consumed between the top and bottom thermal plates required to vaporize and to melt the precipitation at the first temperature and the energy difference between the top and bottom plates required to melt the precipitation at the second temperature. The change in the energy difference can be subtracted to determine the energy required to vaporize the precipitation. Therefore, the sensor controller 204 can perform a substantially similar calculation as described above with a single thermal plate system 301A rather than two or more thermal plate systems.

Figure 6:
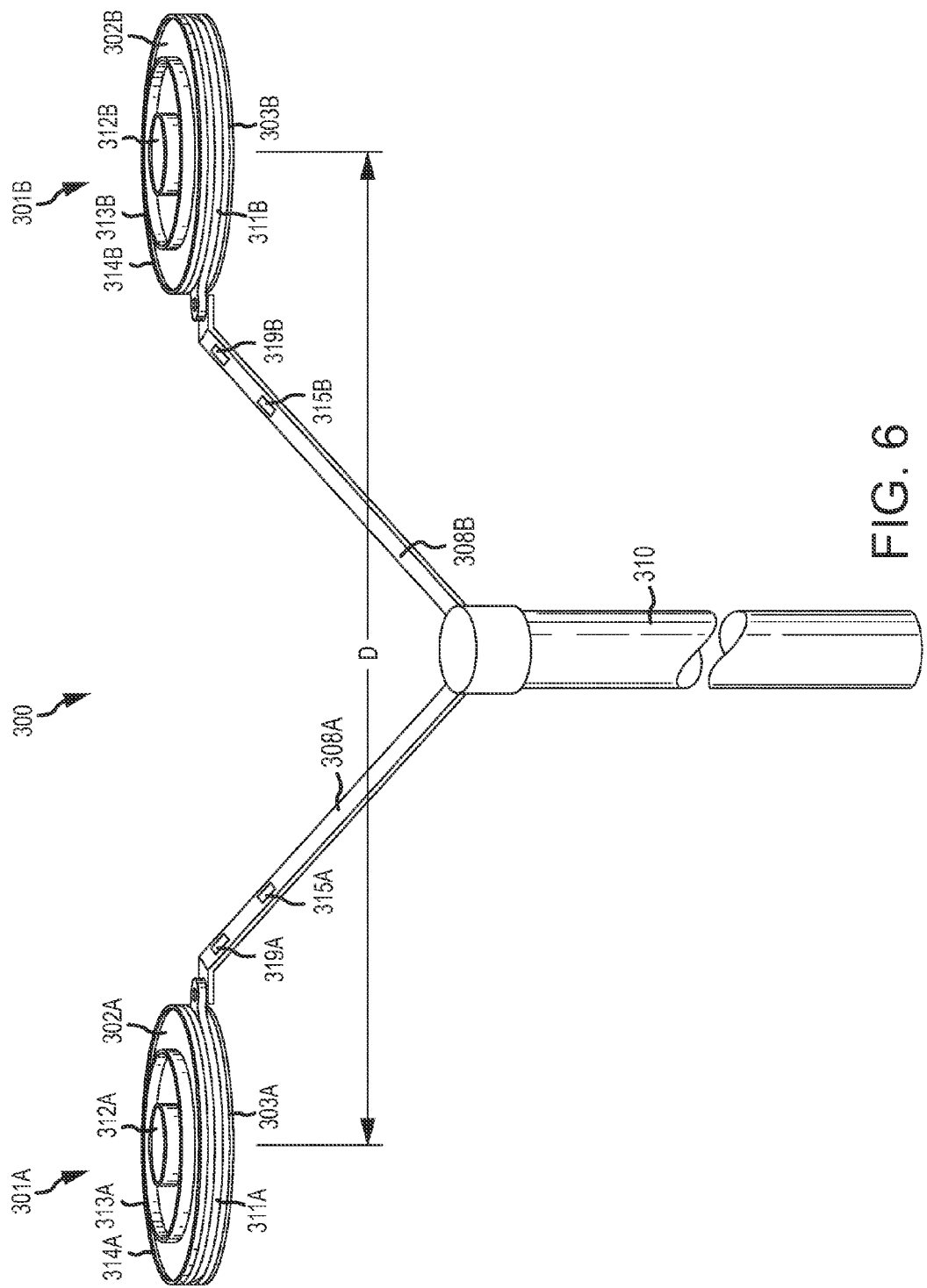
FIG. 6 shows the thermal plate precipitation measurement system according to another embodiment of the invention.

FIG. 6 shows the thermal plate precipitation measurement system 300 according to another embodiment. In the embodiment shown in FIG. 6, the two thermal plate systems 301A, 301B are mounted on a common post 310. Coupled to the common post 310 are individual mounting posts 308A, 308B, which support the top and bottom thermal plates 302, 303. According to an embodiment, this configuration can provide a rigid mount that fixes the orientation of each plate system 301A, 301B.

The present invention as described above provides a novel system and method for operating a thermal plate precipitation measurement system 300 in order to eliminate or reduce noise associated with prior art systems. The present invention utilizes a difference in energy required during a precipitation event for thermal plate systems 301A, 301B maintained at different temperatures. With one temperature being sufficient to vaporize the precipitation and the other temperature sufficient to melt the precipitation, a difference in energy can remove noise that is experienced by both systems. Advantageously, an improved precipitation measurement can be obtained.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other precipitation measurement systems, and not just to the embodiments described above and shown in the accompanying figures. Accordingly, the scope of the invention should be determined from the following claims.

We claim:

1. A thermal plate precipitation measurement system (300), comprising:
    a first thermal plate system (301A) including first and second thermal plates (302A, 303A) configured at a first temperature; and
    a second thermal plate system (301B) including first and second thermal plates (302B, 303B) configured at a second temperature different than the first temperature.

2. The thermal plate precipitation measurement system (300) of claim 1, further comprising a sensor controller (304) in communication with the first and second thermal plate systems (301A, 301B) configured to determine a precipitation rate.

3. The thermal plate precipitation measurement system (300) of claim 2, wherein the precipitation rate is determined based on a comparison of a differential power consumption between the first and second thermal plates (302A, 303A) of the first thermal plate system (301A) and a differential power consumption between the first and second thermal plates (302B, 303B) of the second thermal plate system (301B).

4. The thermal plate precipitation measurement system (300) of claim 3, wherein the sensor controller (304) is further configured to determine that the precipitation contains at least some frozen precipitation if a difference in the differential power consumptions of the first and second thermal plates (302B, 303B) of the second thermal plate system (301B) exceeds a threshold difference.

5. The thermal plate precipitation measurement system (300) of claim 2, wherein the sensor controller (304) is further configured to:
    determine an expected differential power consumption of the first and second thermal plates (302B, 303B) of the second thermal plate system (301B) from the determined precipitation rate;
    compare the expected differential power consumption to a determined differential power consumption of the first and second thermal plates (302B, 303B) of the second thermal plate system (301B); and
    determine a precipitation composition based on the comparison between the expected differential power consumption and the determined differential power consumption.

6. The thermal plate precipitation measurement system (300) of claim 1, wherein the first thermal plate (302A, 302B) of each of the first and second thermal plate systems (301A, 301B) is exposed to falling precipitation and the second thermal plate (303A, 303B) of each of the first and second thermal plate systems (301A, 301B) is positioned parallel to and under the first thermal plate (302A, 302B) so as to protect the second thermal plate (303A, 303B) from the falling precipitation.

7. The thermal plate precipitation measurement system (300) of claim 1, wherein each of the first and second thermal plate systems (301A, 301B) further comprises an insulating plate (311A, 311B) positioned between the first thermal plate (302A, 302B) and the second thermal plate (303A, 303B).

8. A method of operating a thermal plate precipitation measurement system including a first thermal plate system with first and second thermal plates and a second thermal plate system with first and second thermal plates, the method comprising steps of:
    configuring the first and second thermal plates of the first thermal plate system at a first temperature;
    configuring the first and second thermal plates of the second thermal plate system at a second temperature different than the first temperature; and
    determining a precipitation rate based on signals received from the first and second thermal plate systems.

9. The method of claim 8, wherein the signals received from the first and second thermal plate systems represent a differential power consumption between the first and second thermal plates of each of the first and second thermal plate systems.

10. The method of claim 8, further comprising a step of determining that the precipitation contains at least some frozen precipitation if a differential power consumption of the second thermal plate system exceeds a threshold difference.

11. The method of claim 8, further comprising steps of:
    determining an expected differential power consumption of the second thermal plate system from the determined precipitation rate;
    comparing the expected differential power consumption to a determined differential power consumption of the second thermal plate system; and
    determining a precipitation composition based on the comparison.

12. A method of operating a thermal plate precipitation measurement system including a first thermal plate and a second thermal plate, comprising steps of:
    heating the first and second thermal plates to a first temperature for a predetermined amount of time;
    heating the first and second thermal plates to a second temperature different than the first temperature; and
    determining a precipitation rate based on a comparison of signals received when the first and second thermal plates are at the first temperature and when the first and second thermal plates are at the second temperature.

13. The method of claim 12, further comprising steps of:
    determining a differential power consumption between the first and second thermal plates required to maintain the first temperature; wherein determining a differential power consumption between the first and second thermal plates required to maintain the second temperature;

wherein the signals represent the differential power consumption of the first and second thermal plates at the first and second temperatures.

14. The method of claim 12, further comprising a step of determining that the precipitation contains at least some frozen precipitation if a differential power consumption exceeds a threshold difference when heated to the second temperature.

15. The method of claim 12, further comprising steps of:

determining an expected differential power consumption at the second temperature from the determined precipitation rate;

comparing the expected differential power consumption to a determined differential power consumption at the second temperature; and determining a precipitation composition based on the comparison.

\* \* \* \* \*

UNITED STATES PATENT AND TRADEMARK OFFICE
CERTIFICATE OF CORRECTION

PATENT NO. : 8,505,377 B2  
APPLICATION NO. : 13/096831  
DATED : August 13, 2013  
INVENTOR(S) : Roy M. Rasmussen and John Hallett Page 1 of 1

It is certified that error appears in the above-identified patent and that said Letters Patent is hereby corrected as shown below:

Title Page item (75),

Please correct the spelling error of inventor "John Hallet" to John Hallett.

Signed and Sealed this
Eighth Day of October, 2013

Teresa Stanek Rea
*Deputy Director of the United States Patent and Trademark Office*